US010526515B2

(12) United States Patent
Pyun et al.

(10) Patent No.: US 10,526,515 B2
(45) Date of Patent: Jan. 7, 2020

(54) HALOGEN-FREE FLAME RETARDANT PRESSURE SENSITIVE ADHESIVE AND TAPE

(71) Applicant: 3M INNOVATIVE PROPERTIES COMPANY, St. Paul, MN (US)

(72) Inventors: Eumi Pyun, St. Paul, MN (US); Dennis E. Vogel, Lake Elmo, MN (US); Thu-Van Tran, Maplewood, MN (US); Tabitha A. Clem, Woodbury, MN (US); Haohao Lin, Austin, TX (US); William H. Moser, Edina, MN (US); Anthony R. Plepys, Concord, MA (US); Richard B. Ross, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 202 days.

(21) Appl. No.: 15/541,067

(22) PCT Filed: Dec. 18, 2015

(86) PCT No.: PCT/US2015/066809
§ 371 (c)(1),
(2) Date: Jun. 30, 2017

(87) PCT Pub. No.: WO2016/109261
PCT Pub. Date: Jul. 7, 2016

(65) Prior Publication Data
US 2018/0044564 A1    Feb. 15, 2018

Related U.S. Application Data

(60) Provisional application No. 62/097,703, filed on Dec. 30, 2014.

(51) Int. Cl.
| | | |
|---|---|---|
| *C09J 143/02* | (2006.01) |
| *C09J 7/38* | (2018.01) |
| *C09J 133/08* | (2006.01) |
| *C09J 133/10* | (2006.01) |
| *C08F 265/06* | (2006.01) |
| *C08F 220/12* | (2006.01) |
| *C08F 220/18* | (2006.01) |
| *C08F 230/02* | (2006.01) |
| *C09K 21/14* | (2006.01) |
| *C09D 143/02* | (2006.01) |

(52) U.S. Cl.
CPC ........... *C09J 143/02* (2013.01); *C08F 220/12* (2013.01); *C08F 230/02* (2013.01); *C08F 265/06* (2013.01); *C09D 143/02* (2013.01); *C09J 7/385* (2018.01); *C09J 133/08* (2013.01); *C09J 133/10* (2013.01); *C09K 21/14* (2013.01); *C09J 2201/606* (2013.01); *C09J 2203/326* (2013.01); *C09J 2433/00* (2013.01)

(58) Field of Classification Search
None
See application file for complete search history.

(56) References Cited

U.S. PATENT DOCUMENTS

| | | |
|---|---|---|
| 5,851,663 A | 12/1998 | Parsons et al. |
| 6,022,914 A | 2/2000 | Nowak et al. |
| 7,385,020 B2 | 6/2008 | Anderson et al. |
| 9,187,597 B1 | 11/2015 | Boday et al. |
| 2009/0104444 A1 | 4/2009 | Garcia-Ramirez et al. |
| 2012/0171481 A1 | 7/2012 | Ha et al. |
| 2012/0288692 A1 | 11/2012 | Broyles et al. |

FOREIGN PATENT DOCUMENTS

| | | | |
|---|---|---|---|
| CN | 101760145 | 5/2012 | |
| CN | 101805567 | 10/2012 | |
| EP | 1479746 | 9/2014 | |
| JP | H10-110082 | 4/1998 | |
| JP | H10-140094 | 5/1998 | |
| JP | 11-035588 A2 | 2/1999 | |
| JP | 3454544 | 10/2003 | |
| JP | 2010-229367 | 10/2010 | |
| JP | 2010-235846 | 10/2010 | |
| TW | 201444895 A | 12/2014 | |
| WO | WO-2012129362 A2 * | 9/2012 | ............ C09J 133/08 |
| WO | WO 2013-066906 | 5/2013 | |
| WO | WO 2014-099654 | 6/2014 | |
| WO | WO 2016-109262 | 7/2016 | |

OTHER PUBLICATIONS

Organophosphorous Compounds-Toxicity and Detection Approach (Year: 2014).*
Ebdon, "Flame Retardance in Some Polystyrenes and Poly (Methyl Methacrylate) With Covalently Bound Phosphorus-Containing Groups: Initial Screening Experiments and Some Laser Pyrolysis Mechanistic Studies," Polymer Degradation and Stability, Sep. 2000, vol. 69, No. 3, pp. 267-277.
Ebdon, "Thermal Degradation and Flame Retardance in Copolymers of Methyl Methacrylate with Diethyl (Methacryloyloxymethyl) Phosphonate," Polymer Degradation and Stability, 2000, vol. 70, No. 3, pp. 425-436.
El Asri, "An Efficient Process for Synthesizing and Hydrolyzing a Phosphonated Methacrylate: Investigation of the Adhesive and Anticorrosive Properties," Journal of Polymer Science: Part A, Jul. 2008, vol. 46, No. 14, pp. 4794-4803.
Gentilhomme, "Thermal Degradation of Methyl Methacrylate Polymers Functionalized by Phosphorus-Containing Molecules-II: Initial Flame Retardance and Mechanistic Studies," Polymer Degradation and Stability, 2003, vol. 82, No. 2, pp. 347-355.
Gentilhomme, "Thermal Degradation of Methyl Methacrylate Polymers Functionalized by Phosphorus-Containing Molecules-III: Cone Calorimeter Experiments and Investigation of Residues," Polymer Degradation and Stability, Apr. 2005, vol. 88, No. 1, pp. 92-97.

(Continued)

*Primary Examiner* — Frank D Ducheneaux
(74) *Attorney, Agent, or Firm* — Janet A. Kling

(57) ABSTRACT

A halogen-free flame retardant adhesive comprises an acrylic copolymer preparable by polymerization of monomers comprising a first monomer which comprises a low glass transition temperature (Tg) monomer, a second monomer which comprises a high Tg monomer, wherein at least one of the first and second monomers comprises a (meth) acrylate, and a phosphinate containing monomer.

20 Claims, No Drawings

(56) References Cited

OTHER PUBLICATIONS

Price, "Cone Calorimetry Studies of Polymer Systems Flame Retarded by Chemically Bonded Phosphorus," Polymer Degradation and Stability Apr. 2005, vol. 88, No. 1, pp. 74-79.
Price, "Flame Retardance of Poly (Methyl Methacrylate) Modified with Phosphorus-Containing Compounds," Polymer Degradation and Stability, 2002, vol. 77, No. 2, pp. 227-233.
Price, "Flame Retarding Poly (Methyl Methacrylate) with Phosphorus-Containing Compounds: Comparison of an Additive with a Reactive Approach," Polymer Degradation and Stability, 2001, vol. 74, No. 3, pp. 441-447.
Wang, "The Flame-Retardant Material-1. Studies on Thermal Characteristics and Flame Retardance Behavior of Phosphorus-Containing Copolymer of Methyl Methacrylate with 2-Methacryloxyethyl Phenyl Phosphate," Polymer Degradation and Stability, Nov. 2006, vol. 91, No. 11, pp. 2683-2690.
Zhu, "Thermal Degradation of a New Flame Retardant Phosphate Methacrylate Polymer," Polymer Degradation and Stability, 2003, vol. 80, No. 2, pp. 217-222.
International Search Report for PCT International Application No. PCT/US2015/066815, dated Mar. 14, 2016, 4 pages.
International Search Report for PCT International Application No. PCT/US2015/066809, dated Mar. 14, 2016, 4 pages.
Search Report for TW Appl. No. 104144294, dated Jul. 4, 2019, 2 pp.

\* cited by examiner

HALOGEN-FREE FLAME RETARDANT PRESSURE SENSITIVE ADHESIVE AND TAPE

CROSS REFERENCE TO RELATED APPLICATIONS

This application is a national stage filing under 35 U.S.C. 371 of PCT/US2015/066809, filed Dec. 18, 2015, which claims the benefit of U.S. Provisional Application No. 62/097703, filed Dec. 30, 2014, the disclosure of which is incorporated by reference in its/their entirety herein.

TECHNICAL FIELD

This disclosure relates to halogen free flame retardant adhesives and adhesive articles comprising acrylic copolymers.

BACKGROUND

Flame retardant adhesives and tapes are used in many industries and for many different purposes. They are used, for example, in the electrical industry as insulating tapes. Many conventional flame retardant compositions, widely used as flame retardant adhesives and tapes, utilize one or more halogen-containing materials.

Pressure sensitive adhesive (PSA) tapes are used in a variety of applications with elevated fire/flame risk (aircrafts, cars, trains, ships, electrical wiring, electronics, etc.). Polymer-based PSAs can be flammable and a variety of flame retardants are used to minimize the fire/flame risk associated with the use of PSAs for specific applications. Flame retardants can reduce the flammability of materials by a variety of mechanisms including: quenching free radicals in the gas phase; reacting with chemical fragments from the burning material to initiate char formation; and forming barrier layers within the burning material.

Commonly used flame retardants include halogenated compounds (e.g. polychlorinated biphenyl and polybrominated diphenyl ethers). These flame retardants are well-known and very efficient at fire retardation in combustible materials. However, many compounds in this class of flame retardants are considered hazardous substances. Several of the most effective halogenated flame retardants have been banned by the European Union under the Restriction of Hazardous Substances (RoHS) since Jul. 1, 2006. Several Asian countries and individual states in the United States are also following with similar RoHS directives. In addition, end-product manufacturers are establishing policies to refuse to use halogenated flame retardant materials in their products.

Thus, environmental and safety concerns regarding use of halogen-containing materials in adhesives and related articles have been raised and in response to these concerns, many non-halogenated or halogen-free flame retardant materials have been introduced to be used in place of halogen-containing materials. Phosphorus-based compounds are one class of non-halogenated flame retardants which have been applied to replace halogenated flame retardants in many applications.

A current method to flame retard adhesives and additional polymeric materials is to blend halogenated or phosphorus containing flame retardant additives into the product formulation. However, a disadvantage of this approach is the flame retardant additive can leach out of the product over time. This reduces the flame retardancy of the product. It can also cause potential health and safety concerns related to exposure to harmful flame retardants that have leached out of blankets, clothing, and other commonly used items. In addition, flame retardant materials that migrate to the surface of an adhesive composition can reduce its adhesion strength. Furthermore, care must be taken in the preparation of these adhesive blends to thoroughly mix the flame retardant additive into the adhesive. If the flame retardant is poorly distributed or not miscible throughout the adhesive, regions of the adhesive having a relatively low amount of flame retardant can be less flame retardant than regions of the adhesive having a relatively higher amount of flame retardant.

SUMMARY

Thus, it is desirable to have halogen-free flame retardant adhesives that offer flame resistant properties and also that maintain functional adhesive performance without the risk of the flame retardant leaching out. There is also a desire for articles that contain such adhesives.

In one aspect, a halogen-free flame retardant adhesive comprises an acrylic copolymer preparable by polymerization of monomers comprising a low glass transition temperature (Tg) monomer, a high Tg monomer, wherein at least one of the low Tg and high Tg monomers comprises a (meth)acrylate, and a phosphinate containing monomer. Adhesives comprising copolymers of the present disclosure can be intrinsically flame retardant, with no additional flame retardant additives required.

In another aspect, a tape construction is provided that includes a support material that is substantially free of halogenated materials, has at least two major surfaces, and a flame retardant adhesive disposed on at least one major surface of the support material, wherein the flame retardant adhesive comprises an acrylic copolymer preparable by polymerization of monomers comprising a low Tg monomer, a high Tg monomer, wherein at least one of the low Tg and high Tg monomers is a (meth)acrylate, and a phosphinate containing monomer.

Thus, adhesives and tapes are provided that offer desired flame retardant properties, are simple to make and use, and provide acceptable performance as an adhesive or a tape, with very low risk of the flame retardant leaching out of the adhesive, and a better distribution of flame retardant throughout the adhesive, as the copolymerizable phosphinate containing monomer is incorporated into the copolymer backbone.

The above summary is not intended to describe each disclosed embodiment of every implementation of the present disclosure. The detailed description which follows more particularly exemplifies illustrative embodiments.

DETAILED DESCRIPTION

It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

In this disclosure,

"halogen-free" and "nonhalogenated" are used interchangeably herein and refer to the substantial absence, e.g., trace or ineffective amounts, of halogens, i.e., fluorine, chlorine, bromine, iodine, and astatine;

"flame retardant adhesives or tapes" refer to adhesives and tapes incorporating flame retardant compositions presented herein that can pass the requirements set forth by the flame test of industry standard UL 510 (Underwriters Laboratories Inc., Eighth Edition);

"halogen-free flame retardant" and "nonhalogenated flame retardant" refer to flame retardant materials (e.g., monomers and polymers) that do not contain halogens;

"(meth)acrylate" and "(meth)acrylic" refer to compounds that contain either methacrylate or acrylate functional groups;

"acrylic copolymer" refers to a copolymer in which one or more of its constituent monomers have (meth)acrylate functional groups;

"low Tg monomer" refers to a monomer which, when polymerized to make a homopolymer having a molecular weight of at least about 10,000 g/mol, would yield a homopolymer with a glass transition temperature (Tg)<0° C.;

"high Tg monomer" refers to a monomer which, when polymerized to make a homopolymer having a molecular weight of at least about 10,000 g/mol, would yield a homopolymer with a glass transition temperature (Tg)>0° C.;

"renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

Acceptable adhesive performance refers to meeting the requirements as set forth by the adhesion test included in ASTM D3330/D3330M-04, (Standard Test Method for Peel Adhesion of Pressure-Sensitive Tape".

Adhesives and tape constructions are provided that are flame retardant. There are a variety of definitions and tests associated with flame retardancy. As used herein, an adhesive or a tape can be considered flame retardant when it can inhibit or resist spread of fire. According to the flame test described in the UL510 standard, in order for an adhesive or a tape test specimen to be considered flame retardant, when a test flame is applied to the test specimen, it cannot flame longer than 60 seconds following any of five 15 seconds applications of the test flame, the period between applications being: a) 15 seconds if the specimen flaming ceases within 15 seconds; or b) the duration of the specimen flaming if the specimen flaming persists longer than 15 seconds. The test specimen should not ignite combustible materials in its vicinity or damage more than 25 percent of the indicator flag during, between, or after the five applications of the test flame.

In the present invention, halogen-free flame retardant adhesives are provided that comprise an acrylic copolymer preparable by polymerization of monomers comprising a first low Tg monomer, a second high Tg monomer, wherein at least one of the first and second monomers is a (meth) acrylate, and a phosphinate containing monomer. In one aspect, the phosphinate containing flame retardant monomers are covalently bonded into the polymer backbone, eliminating the possibility of leaching out over time. Copolymers prepared from first and second (meth)acrylic monomers, such as IOA and AA, and phosphinate containing monomers are demonstrated to be PSAs with suitable adhesive properties. By optimizing chemistry and structure, these types of adhesives can be formulated into PSAs with a broad range of adhesive and flame retardant properties. Combinations of more than one low Tg monomer and/or more than one high Tg monomer can also be used to prepare the copolymer, to further tailor the properties of the adhesive.

In some embodiments, the adhesives of the present invention comprise acrylic copolymers that are prepared by covalently bonding a phosphorous containing monomer with other constituent monomers. In one aspect, an acrylic copolymer is prepared by covalently bonding a phosphinate containing monomer with other constituent monomers. As a result, the phosphinate flame retardant is typically more homogeneously dispersed throughout the adhesive, particularly in comparison to adhesives of the prior art that comprise a blend of a polymer and a flame retardant. Furthermore, because the flame retardant is a part of the acrylic copolymer molecule, the additional processing step of blending a flame retardant into the adhesive can be eliminated.

The first monomer used in the preparation of the acrylic copolymer can comprise a low Tg monomer, where the monomer, when polymerized to make a homopolymer having a molecular weight of at least about 10,000 g/mol, would yield a homopolymer with a Tg<0° C. In one aspect, the low Tg monomer comprises a low Tg (meth)acrylate monomer. In some embodiments, the low Tg monomer may comprise an alkyl (meth)acrylate wherein the alkyl group contains between 4 and 12 carbon atoms, such as n-hexyl acrylate, n-butyl acrylate, isobutyl acrylate, n-octyl acrylate, 2-octyl acrylate, and lauryl acrylate. In some embodiments, the low Tg (meth)acrylate monomer may comprise isooctyl acrylate (IOA). In another example, the low Tg (meth)acrylate monomer may comprise 2-ethyl hexyl acrylate (EHA). Other suitable low Tg monomers can include dimethyl amino ethyl acrylate, tridecyl acrylate, 2-ethoxy ethyl acrylate, ethoxyethoxy ethyl acrylate, 2-hydroxy ethyl acrylate, 4-hydroxy butyl acrylate, 2-methoxy ethyl acrylate, 2-phenoxy ethyl acrylate, and the like, and combinations thereof. In some embodiments, the low Tg monomer may comprise urethane acrylates and silicone acrylates.

In some aspects, the first monomer comprises the ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol. In some embodiments, the renewable first monomer comprises a bio-based content of at least 25, 30, 35, 40, 45, or 50 wt % using ASTM D6866-10, method B. In other embodiments, the renewable first monomer comprises a bio-based content of at least 55, 60, 65, 70, 75, or 80 wt %. In yet other embodiments, the renewable first monomer comprises a bio-based content of at least 85, 90, 95, 96, 97, 99 or 99 wt-%.

In another aspect of the invention, the acrylic copolymer, after polymerization, comprises from about 40 wt % to about 70 wt %, or from about 40 wt % to about 60 wt %, or from about 40 wt % to about 50 wt % of the low Tg (meth)acrylic monomeric unit.

The second monomer used to prepare the acrylic copolymer can comprise a high Tg monomer, where the monomer, when polymerized to make a homopolymer having a molecular weight of at least about 10,000 g/mol, would yield a homopolymer with a Tg>0° C. In one aspect, the high Tg monomer comprises a high Tg (meth)acrylate monomer. For example, the high Tg (meth)acrylate monomer may comprise acrylic acid (AA). In another example, the high Tg (meth)acrylate monomer may comprise isobornyl acrylate (IBXA). Other suitable high Tg monomers can include methyl acrylate, methyl methacrylate, butyl methacrylate, and t-butyl acrylate, hexadecyl acrylate, ethyl methacrylate, benzyl acrylate, cyclohexyl acrylate, biphenyl ethyl acrylate, N,N-dimethyl amino ethyl methacrylate, hydroxyl ethyl methacrylate, aliphatic urethane acrylate, aromatic urethane acrylates, epoxy acrylates and the like. Suitable non-(meth)acrylic high Tg monomers include acrylamide, N,N-dimethyl acrylamide, N-vinyl pyrrolidone, vinyl acetate, N-octyl acrylamide, N-isopropyl acrylamide, t-octyl acrylamide, acrylamide, and N-vinyl caprolactam.

In another aspect of the invention, the acrylic copolymer comprises from about 2 wt % to about 15 wt %, or from about 2 wt % to about 10 wt %, or, from about 2 wt % to about 5 wt % of the high Tg (meth)acrylic monomeric unit.

In some aspects, the flame retardant adhesive described herein comprises an acrylic copolymer polymerizable from monomers comprising low Tg and high Tg monomers and a phosphorous containing monomer. In one aspect, the phosphorous containing monomer comprises a phosphinate-based monomer. In one aspect, the phosphinate-based monomer is an acrylate-functional monomer that can be represented by:

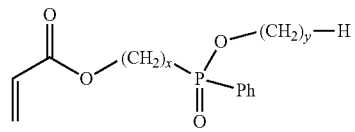

in which x and y each represent an integer, x can be in the range between 1 to 5, inclusively, and y can be in the range between 0 to 5, inclusively. In various embodiments the values of x and y may be either the same or different from each other. In one further aspect, the phosphinate-based monomer comprises Ethyl Acryloyloxymethylphenylphosphinate (EAMPP), which can be represented by:

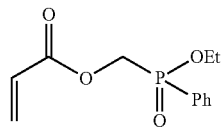

in which Et denotes an ethyl group and Ph denotes a phenyl group. EAMPP can be synthesized as is described in further detail in the Examples section.

In some aspects of the invention, the acrylic copolymer, after polymerization, comprises about 20 wt % to about 60 wt %, or from about 25 wt % to about 50 wt % of the phosphinate-containing monomeric unit.

In some embodiments, the constituent monomers used to create the acrylic copolymer can also comprise a copolymerizable oligomer or macromonomer having a molecular weight between 3000 and 22,000 g/mol. In further embodiments, the macromonomer is a methyl methacrylate macromonomer having reactive vinyl end groups. Suitable macromonomers include ELVACITE 1010 and ELVACITE 1020 from Lucite International, USA. Suitable oligomers include polyester acrylate, aromatic epoxy acrylate, and aliphatic epoxy acrylate, all of which are available from Sartomer.

In addition, the halogen-free flame retardant adhesive can also comprise a copolymer that is polymerized utilizing an initiator for initiating the polymerization process. For example, a commercially available thermal initiator or commercially available UV photoinitiators can be used. In addition, commercially available solvents and cross-linkers can be included. As such, the acrylic copolymer reaction product can be formed using the polymerization processes described below and in the Examples section.

The acrylic copolymers of the present invention can be polymerized by any type of polymerization reaction commonly known in that art. The polymerization reaction can be performed in solvent or in a bulk state substantially free of solvent. In some embodiments, the acrylic copolymers are formed via free-radical polymerization. In other embodiments, the acrylic copolymers can be created via a radiation process polymerization such as photopolymerization or ionized polymerization.

The amounts of each of the constituent monomers that are reacted to create the acrylic copolymer may be varied over a wide range but are present in an amount sufficient to render the adhesive or tape flame retardant while having desirable adhesive properties. As the amounts of each of the constituent monomeric units of the acrylic copolymer are changed, the performance properties such as adhesion may be adversely affected depending on the intended application for the adhesive or tape. In some embodiments, the disclosed acrylic copolymers offer desired flame retardant properties without substantially affecting functional performance of the adhesives and tapes, such as failure of adhesion to an intended surface or reduction in insulating properties of an insulating tape.

Generally, the adhesives of the present disclosure comprise at least about 70 wt % of the acrylic copolymer. The adhesives may include other components; i.e., components collectively accounting for less than about 30 wt % of the adhesive. Such additional components include those typically used in adhesive formulations such as fillers, dyes, pigments, plasticizers, tackifiers, stabilizers, conductive particles, and the like, as understood by those skilled in the art.

The provided flame retardant adhesives may be used in any application in which a pressure-sensitive adhesive having a degree of flame retardancy is desired. The provided flame retardant adhesives also find particular utility in tape constructions. Such tape constructions generally comprise a support material onto which one or more functional or structural layers are applied (typically by coating). One or more of the provided flame retardant adhesives may be used in or with such tape constructions by coating or otherwise applying the adhesive onto the support material.

In at least one embodiment of the disclosure, a multi-layered tape construction includes a flame retardant adhesive applied to a support material having at least two major surfaces. The flame retardant adhesive is provided as a layer applied to one of the major surfaces of support material. The flame retardant adhesive layer can be of any desired and workable thickness, but is generally in the range from about 20 µm to about 100 µm or even possibly more. The support material is, typically, free of halogen-containing compounds. Suitable support materials include, for example: polymer materials such as polyesters (e.g., PET (polyethylene terephthalate)), polyolefins, polyamides and polyimides; natural and synthetic rubber materials; paper materials; metal foils, glass cloths, foams, woven and nonwoven webs; and other suitable types of materials. The support material can be of any desired and workable thickness, but is generally between about 25 µm and about 125 µm thick.

EXAMPLES

The following examples and comparative examples are offered to aid in the understanding of the present invention and are not to be construed as limiting the scope thereof. Unless otherwise indicated, all parts and percentages are by weight. The following test methods and protocols were employed in the evaluation of the illustrative and comparative examples that follow.

Preparation of Phosphinate-Containing Monomer

Unless otherwise indicated, the reagents below are commonly available from chemical suppliers such as Sigma-Aldrich Co. (USA) and Alfa Aesar (USA.)

Ethyl Acryloyloxymethylphenylphosphinate (EAMPP) monomer was synthesized as follows. A mixture of 150.0 g (881.6 mmoles, 1 eq) of ethyl phenylphosphinate and 4.460 g (44.08 mmoles, 0.05 eq) of triethylamine was heated to 80° C. 26.47 g (881.6 mmoles, 1 eq) of paraformaldehyde was added in small portions. During the paraformaldehyde addition, the reaction temperature reached an exotherm of 100° C., and the remainder of the paraformaldehyde was added in portions to keep the reaction temperature between 80° C. and 100° C. The reaction was then stirred at 100° C. for 2 hours and allowed to cool to room temperature. To this mixture was added 120.4 g (1190 mmoles, 1.35 eq) of triethylamine and 4.114 g (33.68 mmoles, 0.0382 eq) of 4-dimethylaminopyridine followed by 555 g of methyl t-butyl ether. To this mixture was added 104.1 g (1150 mmoles, 1.305 eq) of acryloyl chloride at such a rate that the reaction temperature reached 50° C. and was remained at that temperature during the addition. The mixture was then held at 40° C. for 3 hours. The reaction mixture was cooled to room temperature and 1061 g of a 8.28 wt % solution (1046 mmoles, 1.186 eq) of sodium bicarbonate was added while stirring. The organic phase was dried with magnesium sulfate and 0.0328 g of 4-methoxyphenol (MEHQ) was added. The reaction mixture was concentrated in vacuo (10 torr, 2 hours, 40° C.) to give the desired product.

Preparation of Copolymer Adhesives and Tapes

The exemplary flame retardant copolymers of the invention were prepared using methods known in the art, using the materials listed in Table 1.

TABLE 1

MATERIALS USED

| Product Name | Description | Source |
| --- | --- | --- |
| 2-Ethyl Hexyl Acrylate (EHA) | Low $T_g$ Monomer | Sartomer, USA |
| Isooctyl acrylate (IOA) | Low $T_g$ Monomer | Sartomer, USA |
| Acrylic acid (AA) | High $T_g$ Monomer | Sartomer, USA |
| Acrylamide (ACM) | High $T_g$ Monomer | Sigma-Aldrich, USA |
| ELVACITE 1010 (Elv) | PMMA Macromonomer with Reactive Vinyl Groups | Lucite International, USA |
| 2,2"-azobis (2-methylbutyronitrile) (AMBN) - VAZO 67 | Thermal Initiator | DuPont, USA |
| Benzyl dimethyl ketal - IRGACURE 651 | Photoinitiator | BASF, USA |
| Ethyl acetate (EtOAc) | Solvent | Sigma-Aldrich, USA |
| 1,6-Hexanediol Diacrylate (HDDA) | Crosslinking Agent | DuPont, USA |

Solvent Polymerization of Copolymers

Amounts of each monomer used in the polymerization of comparative examples and illustrative examples are presented in Table 2. For each example, monomers were added to a 100-g size glass bottle in the amounts indicated in Table 2 and were mixed in ethyl acetate solvent. About 0.4 phr (parts per hundred total monomers) thermal initiator VAZO 67 was added. Solid content for the whole mixture was approximately 40% by weight. After the mixture was homogeneously mixed, it was deoxygenated using nitrogen ($N_2$) gas. The bottle was sealed and secured in a cage holder. The cage holder was submerged in water in a Launder-Ometer at 60° C. and was rotated for 24 hours. After 24 hours, the bottle was cooled to room temperature before coating on PET backing film having a thickness of 1.2 mil (0.0012 inch, 0.030 mm). The coated film was dried in the oven at 70° C. for 15 minutes. Adhesive samples were conditioned at 25° C. and 50% constant relative humidity (RH) overnight prior to testing.

Solvent polymerized adhesive formulations were coated from toluene solution onto PET backing by knife coater targeting a dry coating thickness of approximately 1.5 mils (38 microns, μm). The coatings were dried at 70° C. for 15 min and the tape samples were then stored in a constant temperature (25° C.) and constant humidity (RH 50%) room for conditioning.

Bulk Polymerization of Copolymers

For each example, monomers were added to an 8-ounce jar in the amounts indicated in Table 2. About 0.04 phr of IRGACURE 651 was added. After the IRGACURE 651 was dissolved, the mixture was deoxygenated and then exposed to a low power (less than 10 milliWatts/square centimeter) UV-A ultraviolet light using a blacklight bulb. Such bulbs are referred to as UV-A bulbs because their output occurs primarily between about 320 and 390 nanometers with a peak emission at around 350 nanometers in what is referred to as the UV-A spectral region. The mixture was exposed until a pre-adhesive polymeric syrup was formed having a Brookfield viscosity of about 1800 cps. Air was then introduced into the syrup.

Another 0.19 g of IRGACURE 651 and 0.08 phr of HDDA crosslinker was then added to the viscous mixture. The mixture was then knife-coated at about 1.5 mils (0.038 mm) gap between a 1.2 mil (0.030 mm) thick PET backing and a silicone release liner. The coating was then exposed to UV lamp for 8 minutes to effect the polymerization to yield an acrylic pressure sensitive adhesive between the PET backing and the silicone release liner. Adhesive samples were conditioned at 25° C. and 50% RH overnight prior to testing.

TABLE 2

DESCRIPTION OF COPOLYMERS

| Ex. # | Low Tg Monomer and Amount (wt %) | | High Tg Monomer and Amount (wt %) | | Amount of EAMPP (wt %) | Amount of Elv (wt %) | Polymerization Method |
|---|---|---|---|---|---|---|---|
| 1 | 60.13 | IOA | 3.16 | AA | 36.71 | 0.0 | solvent |
| 2 | 48.47 | IOA | 2.55 | AA | 48.98 | 0.0 | solvent |
| 3 | 58.86 | IOA | 4.43 | ACM | 36.71 | 0.0 | solvent |
| 4 | 56.96 | EHA | 4.43 | ACM | 36.71 | 1.9 | solvent |
| 5 | 60.14 | IOA | 3.17 | AA | 36.71 | 0.0 | bulk |
| 6 | 48.45 | IOA | 2.55 | AA | 49.0 | 0.0 | bulk |
| 7 | 65.7 | EHA | 7.3 | AA | 27.0 | 0.0 | bulk |
| 8 | 63.0 | EHA | 7.0 | AA | 30.0 | 0.0 | bulk |
| 9 | 60.30 | EHA | 6.70 | AA | 33.0 | 0.0 | bulk |
| 10 | 58.5 | EHA | 6.5 | AA | 35.0 | 0.0 | bulk |
| CE1 | 71.44 | IOA | 3.76 | AA | 24.81 | 0.0 | solvent |
| CE2 | 93.0 | IOA | 7.0 | ACM | 0.0 | 0.0 | solvent |
| CE3 | 90.0 | EHA | 7.0 | ACM | 0.0 | 3.0 | solvent |
| CE4 | 95.0 | IOA | 5.0 | AA | 0.0 | 0.0 | bulk |
| CE5 | 71.44 | IOA | 3.76 | AA | 24.8 | 0.0 | bulk |
| CE6 | 90 | EHA | 10 | AA | 0.0 | 0.0 | bulk |
| CE7 | 67.5 | EHA | 7.5 | AA | 25.0 | 0.0 | bulk |

Test Methodologies

Peel Adhesion Strength

This test measures the force required to peel a tape article from a substrate at an angle of 180 degrees. The test was performed on conditioned tapes prepared in the examples using the procedure described in the referenced ASTM Test Method ASTM D3330/D3330M-04, "Standard Test Method for Peel Adhesion of Pressure-Sensitive Tape" using a stainless steel substrate.

Each test sample was prepared by adhering a 0.5 inch (1.27 cm) wide tape (prepared as described above) to a stainless steel plate and rolling over the tape once with a 2 kg roller. The tape was tested on a peel tester at a plate speed of 12 inches/min (30.5 cm/min). Two samples were tested for each example. Values were measured in ounces per half inch (oz/0.5 in) and reported as an average.

Shear Strength

The static shear strength of the adhesive tapes of the present invention was also measured. The test was performed on conditioned tapes prepared in the examples using the procedure described in the referenced ASTM Test Method ASTM D-3654/D 3654M 06, "Standard Test Methods for Shear Adhesion of Pressure-Sensitive Tapes" using the variations described below. The end of the tape was adhered to a stainless steel plate, suspended at a 90 degree angle from horizontal, and a weight was attached to the free end of the tape. Tests were run either at room temperature (RT, 23° C.) or at elevated temperature (70° C.).

70° C. Shear Test: A test sample was prepared from the conditioned tapes prepared in the examples. A 0.5 inch (1.27 cm) wide tape was adhered to one edge of a stainless steel plate so it overlapped the panel by 1 inch (2.54 cm), and a 2-kg roller was rolled twice over the portion of the tape adhered to the panel. A 0.5 kg load was attached to the free end of the tape, and the panel was suspended at a 90 degree angle from horizontal in an oven set at 70° C. The time, in minutes, for the tape to pull away from the panel was measured and the time to failure and the mode of failure was recorded. The test was terminated if failure had not occurred in 10,000 minutes and the result was recorded as "10,000+" minutes.

Room Temperature Shear Test: Test samples were prepared and tested in the same manner as for 70° C. Shear except that a 1 kg weight was attached to the tape and the test panel was suspended in a controlled environment room (23° C./50% Relative Humidity).

UL510 Flammability Test

The samples were tested according to the UL510 flammability/burn test. Each tape samples was wrapped on a steel rod and exposed to an open flame for a period of fifteen seconds. Upon exposure to the flame, any flame on the test specimen (which typically catches fire) must extinguish in less than 60 seconds to pass the test. The test was repeated five times. Any extinguishing time longer than 60 seconds was considered a failure for the specimen. Results are reported below as "Pass" or "Fail." In addition, no dripping should be observed, and a Kraft-paper flag placed near the top of the rod should not catch fire. Further information regarding the test may be found in the description of the UL 510 standard published by Underwriters Laboratory of Northbrook, Ill., USA.

Results

Adhesive Properties

Adhesive properties of copolymers described in Table 2 to stainless steel (SS) substrates are shown in Tables 3 and 4. In Table 3, a failure mode of "lr" signifies that the adhesive failed cohesively, leaving a small amount of residue on the substrate, and "cl" signifies that the adhesive failed adhesively, leaving a substrate that appeared clean to the naked eye.

TABLE 3

PEEL ADHESION TEST RESULTS

| Ex. # | Adhesive Thickness mil | Adhesive Thickness μm | oz/0.5 inch | N/cm | Failure Mode |
|---|---|---|---|---|---|
| 1 | 1.2 | 30 | 30.1 | 6.98 | lr |
| 2 | 1.1 | 28 | 30.3 | 6.59 | lr |
| 3 | 1.3 | 33 | 25.6 | 6.63 | cl |
| 4 | 1.3 | 33 | 34.7 | 4.14 | cl |
| 5 | 1.4 | 36 | 21.5 | 5.60 | cl |
| 6 | 1.9 | 48 | 24.2 | 7.97 | cl |
| 7 | 2.2 | 56 | 17.0 | 7.60 | cl |
| 8 | 2.1 | 53 | 18.3 | 3.55 | cl |
| 9 | 2.1 | 53 | 19.4 | 4.49 | cl |
| 10 | 2.3 | 58 | 20.0 | 4.71 | cl |
| CE1 | 1.3 | 33 | 31.9 | 5.30 | lr |
| CE2 | 1.4 | 36 | 18.9 | 3.72 | cl |
| CE3 | 1.3 | 33 | 36.4 | 3.61 | cl |
| CE4 | 1.6 | 41 | 16.2 | 3.72 | cl |
| CE5 | 1.8 | 46 | 20.5 | 4.01 | cl |
| CE6 | 2.0 | 51 | 17.0 | 4.25 | cl |
| CE7 | 2.0 | 51 | 16.5 | 4.38 | cl |

TABLE 4

SHEAR ADHESION TEST RESULTS

| | Room Temperature (23° C.) | | 70° C. | |
|---|---|---|---|---|
| Ex. # | min | failure mode | min | failure mode |
| 1 | 18 | cohesive | 1 | |
| 2 | 31 | cohesive | 2 | |
| 3 | 10,000+ | | 275 | cohesive |
| 4 | 4 | cohesive | 0 | cohesive |
| 5 | 4724 | adhesive | 856 | adhesive |
| 6 | 4165 | adhesive | 1542 | adhesive |
| 7 | 10,000+ | | 10,000+ | |
| 8 | 10,000+ | | 10,000+ | |
| 9 | 10,000+ | | 10,000+ | |
| 10 | 10,000+ | | 10,000+ | |
| CE1 | 12 | cohesive | 1 | cohesive |
| CE2 | 7959 | cohesive | 81 | cohesive |
| CE3 | 45 | cohesive | | |
| CE4 | 10,000+ | | 10,000+ | |
| CE5 | 2433 | adhesive | 10,000+ | |
| CE6 | 10,000+ | | 10,000+ | |
| CE7 | 10,000+ | | 10,000+ | |

Flame Retardant Properties

Flame retardant properties of the phosphinate-containing copolymer adhesives are shown below in Table 5. For some examples, two replicates were tested, and results from both replicates are presented in Table 5.

TABLE 5

RESULTS OF UL 510 FLAME TEST

| | Extinguish Time, sec | | | | | Did Flag | Dripping | |
|---|---|---|---|---|---|---|---|---|
| Ex. # | 1 | 2 | 3 | 4 | 5 | Burn? | Observed? | Pass/Fail |
| 1 | 38 | 45 | 10 | 0 | 0 | N | N | Pass |
| 2 | 13 | 9 | 10 | 0 | 0 | N | N | Pass |
| 3 | 25/20 | 25/18 | 28/0 | 3/0 | 9/0 | N/N | — | Pass/Pass |
| 4 | 35/21 | 5/19 | 0/10 | 20/22 | 0/0 | N | — | Pass/Pass |
| 5 | 22 | 8 | 14 | 0 | 0 | N | N | Pass |
| 6 | 16 | 2 | 14 | 1 | 0 | Y | N | Pass |
| 7 | 31/40 | 5/2 | 50/54 | 0/0 | 0/0 | N/N | N/N | Pass/Pass |
| 8 | 24/34 | 5/26 | 3/0 | 0/0 | 0/0 | N/N | N/N | Pass/Pass |
| 9 | 17/18 | 4/5 | 1/20 | 0/0 | 0/0 | N/N | N/N | Pass/Pass |
| 10 | 17/0 | 9/10 | 0/10 | 0/0 | 0/14 | N/N | N/N | Pass/Pass |
| CE1 | 1 | >60 | — | — | — | Y | N | Fail |
| CE2 | >60/45 | —/>60 | — | — | — | N/N | — | Fail/Fail |
| CE3 | 6/9 | >60/>60 | — | — | — | N/N | — | Fail/Fail |
| CE4 | >60/>60 | — | — | — | — | Y/Y | N/N | Fail/Fail |
| CE5 | >60 | — | — | — | — | Y | N | Fail |
| CE6 | >60 | — | — | — | — | Y | N | Fail |
| CE7 | 31/30 | >60/15 | —/15 | —/>60 | — | Y/N | N/N | Fail/Fail |

Flame retardant adhesive compositions comprising a copolymer made using acrylic phosphinate have been discovered which pass the UL510 flame test. The adhesive properties are tunable for suitable applications which require flame retardancy with balanced adhesive properties. Phosphinate based flame retardant monomers of this invention are readily copolymerizable into acrylic adhesive systems to provide additional flame retardant properties in conjunction with pressure sensitive adhesive properties.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

The invention claimed is:

1. A halogen-free flame retardant adhesive comprising:
an acrylic copolymer prepared by polymerization of monomers comprising:
  a first monomer which comprises a low glass transition temperature (Tg) monomer,
  a second monomer which comprises a high Tg monomer, wherein at least one of the first and second monomers comprises a (meth)acrylate, and
  a phosphinate-containing, acrylate-functional monomer.

2. A flame retardant adhesive according to claim 1, wherein the acrylic copolymer comprises from about 40 wt % to about 60 wt % of the first monomer, wherein the first monomer is a low Tg (meth)acrylic monomer.

3. A flame retardant adhesive according to claim 1, wherein the first monomer comprises a (meth)acrylate-based monomer selected from the group consisting of n-hexyl acrylate, n-butyl acrylate, isobutyl acrylate, n-octyl acrylate, 2-octyl acrylate, lauryl acrylate, isooctyl acrylate, 2-ethyl hexyl acrylate, dimethyl amino ethyl acrylate, tridecyl acrylate, 2-ethoxy ethyl acrylate, ethoxyethoxy ethyl acrylate, 2-hydroxy ethyl acrylate, 4-hydroxy butyl acrylate, 2-methoxy ethyl acrylate, 2-phenoxy ethyl acrylate, urethane acrylates, silicone acrylates, and combinations thereof.

4. A flame retardant adhesive according to claim 1, wherein the second monomer comprises from about 2 wt % to about 10 wt % of a high Tg (meth)acrylic monomer.

5. A flame retardant adhesive according to claim 1, wherein the second monomer comprises a monomer selected from the group consisting of acrylic acid, isobornyl acrylate, methyl acrylate, methyl methacrylate, butyl methacrylate, t-butyl acrylate, hexadecyl acrylate, ethyl methacrylate, benzyl acrylate, cyclohexyl acrylate, biphenyl ethyl acrylate, N,N-dimethyl amino ethyl methacrylate, hydroxyl ethyl methacrylate, aliphatic urethane acrylate, aromatic urethane acrylates, epoxy acrylates, acrylamide, N,N-dimethyl acrylamide, N-vinyl pyrrolidone, vinyl acetate, N-octyl acrylamide, N-isopropyl acrylamide, t-octyl acrylamide, acrylamide, N-vinyl caprolactam, and combinations thereof.

6. A flame retardant adhesive according to claim 1, wherein the acrylic copolymer comprises from about 25 wt % to about 50 wt % of the phosphinate-containing, acrylate-functional monomer.

7. A flame retardant adhesive according to claim 1, wherein the phosphinate-containing, acrylate-functional monomer comprises a monomer represented by:

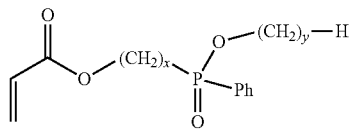

wherein x is an integer between 1 to 5, inclusively; and
wherein y is an integer between 0 to 5, inclusively.

8. A flame retardant adhesive according to claim 1, wherein the monomers of the acrylic copolymer further comprise a macromonomer.

9. A flame retardant adhesive according to claim 8, wherein the macromonomer comprises a poly(methyl methacrylate) macromonomer having reactive vinyl groups.

10. A flame retardant adhesive according to claim 1, further comprising a tackifier.

11. A flame retardant adhesive according to claim 1, wherein the adhesive is a pressure-sensitive adhesive.

12. A tape comprising a support layer having two opposed, major surfaces, and an adhesive disposed on at least one of the major surfaces of the support layer, wherein the adhesive comprises an acrylic copolymer prepared by polymerization of monomers comprising:
  a first monomer which comprises a low glass transition temperature (Tg) monomer,
  a second monomer which comprises a high Tg monomer, wherein at least one of the first and second monomers comprises a (meth)acrylate, and
  a phosphinate-containing, acrylate-functional monomer.

13. An acrylic copolymer prepared by polymerization of monomers comprising:
  a first monomer which comprises a low glass transition temperature (Tg) monomer,
  a second monomer which comprises a high a Tg monomer, wherein at least one of the first and second monomers comprises a (meth)acrylate, and
  a phosphinate-containing, acrylate-functional monomer.

14. An acrylic copolymer according to claim 13 comprising from about 40 wt % to about 60 wt % of the low Tg monomer, wherein the low Tg monomer is a (meth)acrylic monomer.

15. An acrylic copolymer according to claim 13, wherein the first monomer comprises a (meth)acrylate-based monomer selected from the group consisting of n-hexyl acrylate, n-butyl acrylate, isobutyl acrylate, n-octyl acrylate, 2-octyl acrylate, lauryl acrylate, isooctyl acrylate, 2-ethyl hexyl acrylate, dimethyl amino ethyl acrylate, tridecyl acrylate, 2-ethoxy ethyl acrylate, ethoxyethoxy ethyl acrylate, 2-hydroxy ethyl acrylate, 4-hydroxy butyl acrylate, 2-methoxy ethyl acrylate, 2-phenoxy ethyl acrylate, urethane acrylates, silicone acrylates, and combinations thereof.

16. An acrylic copolymer according to claim 13, wherein the second monomer comprises from about 2 wt % to about 10 wt % of a high Tg (meth)acrylic monomer.

17. An acrylic copolymer according to claim 13, wherein the acrylic copolymer comprises from about 25 wt % to about 50 wt % of the phosphinate-containing monomer.

18. An acrylic copolymer according to claim 13, wherein the phosphinate-containing monomer comprises a monomer represented by:

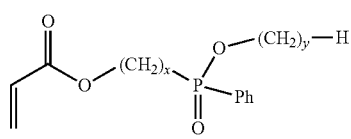

wherein x is an integer between 1 to 5, inclusively; and
wherein y is an integer between 0 to 5, inclusively.

19. An acrylic copolymer according to claim 13, wherein the monomers of the acrylic copolymer further comprise a macromonomer.

20. An acrylic copolymer according to claim 19, wherein the macromonomer comprises a poly(methyl methacrylate) macromonomer having reactive vinyl groups.

* * * * *

UNITED STATES PATENT AND TRADEMARK OFFICE
CERTIFICATE OF CORRECTION

Page 1 of 1

PATENT NO. : 10,526,515 B2
APPLICATION NO. : 15/541067
DATED : January 7, 2020
INVENTOR(S) : Eumi Pyun et al.

It is certified that error appears in the above-identified patent and that said Letters Patent is hereby corrected as shown below:

In the Specification

<u>Column 9,</u>
Line 11, delete "millliWatts/" and insert -- milliWatts/ --, therefor.

In the Claims

<u>Column 14,</u>
Line 21, delete "a high a" and insert -- a high --, therefor.

Signed and Sealed this
Eighteenth Day of August, 2020

Andrei Iancu
*Director of the United States Patent and Trademark Office*